J. F. OHMER.
Furniture-Casters.
No. 168,773.  Patented Oct. 11, 1875.
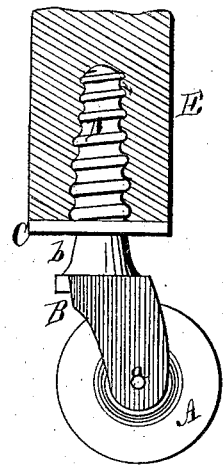
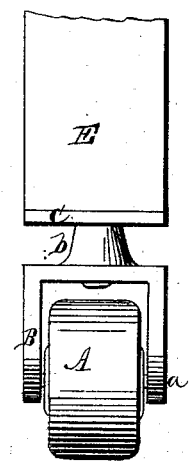
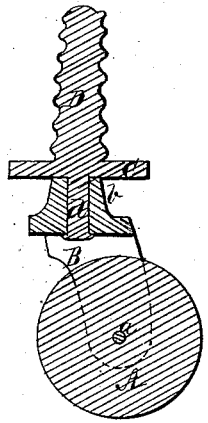

UNITED STATES PATENT OFFICE.

JOHN F. OHMER, OF DAYTON, OHIO.

IMPROVEMENT IN FURNITURE-CASTERS.

Specification forming part of Letters Patent No. 168,773, dated October 11, 1875; application filed April 13, 1875.

*To all whom it may concern:*

Be it known that I, JOHN F. OHMER, of Dayton, in the county of Montgomery and in the State of Ohio, have invented certain new and useful Improvements in Casters; and do hereby declare that the following is a full, clear, and exact description thereof, reference being had to the accompanying drawings and to the letters of reference marked thereon, making a part of this specification.

The nature of my invention consists of a furniture-caster, in which a solid screw for entering the furniture-leg, a plate or flange to rest under the leg, and a projecting rivet for connecting the horn of the roller are formed in one piece of metal, as hereinafter more fully set forth.

In order to enable others skilled in the art to which my invention appertains to make and use the same, I will now proceed to describe its construction and operation, referring to the annexed drawing, in which—

Figure 1 is a side view of the caster, with the leg in which it is inserted in section. Fig. 2 is a front view of the same, and Fig. 3 is a vertical section of the caster.

A represents the ordinary wheel or roller, revolving upon a pin, $a$, in the horn B. This horn is formed with a hub or projection, $b$, on top. C is a plate, formed with a solid screw, D, and a rivet, $d$, as shown. The rivet $d$ is passed through the hub $b$, and riveted on the under side between the horns. When the screw D is screwed into the leg E the friction is between the plate C and hub $b$ of the caster-horns, the hub also giving additional strength to the caster. The thread of the screw D begins at the end sharp and narrow, and widens gradually as it approaches the plate, so as to wedge itself into the wood. This gives it a tendency to hold more secure into the wood. The plate C, not being adapted to nails or screws, can be made small, so as not to project over after being applied to a small foot.

This caster can be manufactured strong and cheap, and is applied without the use of nails or screws, and can be detached at pleasure.

Having thus fully described my invention, what I claim as new, and desire to secure by Letters Patent, is—

The solid screw D, the disk or flange C, and the rivet $d$, formed of one piece of metal, in combination with caster-horns B, substantially as and for the purposes set forth.

In testimony that I claim the foregoing, I have hereunto set my hand this 26th day of March, 1875.

JOHN F. OHMER.

Witnesses:
JAMES KELLY,
JOHN M. SPRIGG.